US010586238B2

(12) United States Patent
Morey et al.

(10) Patent No.: US 10,586,238 B2
(45) Date of Patent: Mar. 10, 2020

(54) AUTOMATION OF IMAGE VALIDATION

(71) Applicant: Microsoft Technology Licensing, LLC, Redmond, WA (US)

(72) Inventors: James David Morey, Everett, WA (US); Phillip Wade Mendoza, Kirkland, WA (US); Monte Windsor, Edgewood, WA (US); Federico Gomez Suarez, Redmond, WA (US); Farhan Khan, Snoqualmie, WA (US); John Mower, Woodinville, WA (US); Graham Ramsay, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/189,823

(22) Filed: Jun. 22, 2016

(65) Prior Publication Data

US 2017/0372322 A1    Dec. 28, 2017

(51) Int. Cl.
*G06K 9/00* (2006.01)
*G06Q 30/00* (2012.01)
(Continued)

(52) U.S. Cl.
CPC ....... *G06Q 30/016* (2013.01); *G06K 9/00442* (2013.01); *G06K 9/40* (2013.01);
(Continued)

(58) Field of Classification Search
CPC .................................................. G06K 2209/01
See application file for complete search history.

(56) References Cited

U.S. PATENT DOCUMENTS

| 5,499,294 A | 3/1996 | Friedman |
| 6,269,446 B1 | 7/2001 | Schumacher et al. |

(Continued)

FOREIGN PATENT DOCUMENTS

| CA | 2465227 | 7/2003 |
| KR | 20140053011 A | 5/2014 |
| WO | WO2014/078696 | 5/2014 |

OTHER PUBLICATIONS

Chen, et al., "Content-Based Image Retrieval for Digital Forensics", In Proceedings of IFIP International Conference on Digital Forensics, vol. 194, Feb. 13, 2005, pp. 271-282.

(Continued)

*Primary Examiner* — Oneal R Mistry
(74) *Attorney, Agent, or Firm* — Newport IP, LLC; Jacob P. Rohwer

(57) ABSTRACT

An automated process to determine whether an image has been modified includes receiving an image (e.g., via a web portal), requesting an image validation service to analyze the image to determine whether the image and/or a subject depicted in the image, has been modified from its original form and, based on the analysis of the image validation service, outputting a likelihood that the image has been modified. The image validation service may analyze the image using one or more operations to determine a likelihood that the image has been modified, and provide an indication of the likelihood that the image has been modified to the web portal. The indication of the likelihood that the image has been modified may be presented on a display via the web portal, and various actions may be suggested or taken based on the likelihood that the image has been modified.

17 Claims, 7 Drawing Sheets

(51) Int. Cl.
  *G06Q 30/02* (2012.01)
  *G06K 9/40* (2006.01)
  *H04L 29/06* (2006.01)
  *G06K 9/64* (2006.01)
  *G06K 9/62* (2006.01)

(52) U.S. Cl.
  CPC .............. *G06K 9/64* (2013.01); *G06Q 30/01* (2013.01); *G06Q 30/012* (2013.01); *G06Q 30/0205* (2013.01); *H04L 63/123* (2013.01); *G06K 9/6277* (2013.01); *G06K 2209/01* (2013.01)

(56) References Cited

U.S. PATENT DOCUMENTS

| | | | |
|---|---|---|---|
| 8,184,850 B2 | 5/2012 | Shi et al. | |
| 8,538,124 B1 | 9/2013 | Harpel et al. | |
| 8,718,379 B2 | 5/2014 | Thomas et al. | |
| 8,965,041 B2 | 2/2015 | Muriello et al. | |
| 9,031,329 B1 | 5/2015 | Farid et al. | |
| 9,077,828 B1* | 7/2015 | Koster | H04M 3/5231 |
| 2003/0169456 A1* | 9/2003 | Suzaki | G06T 1/0028 |
| | | | 358/3.28 |
| 2006/0157559 A1* | 7/2006 | Levy | G06K 17/00 |
| | | | 235/380 |
| 2007/0030364 A1 | 2/2007 | Obrador et al. | |
| 2010/0088123 A1 | 4/2010 | McCall et al. | |
| 2010/0259777 A1* | 10/2010 | Suzuki | G06K 9/2063 |
| | | | 358/1.11 |
| 2011/0176712 A1 | 7/2011 | Hill et al. | |
| 2013/0156257 A1 | 6/2013 | Anan et al. | |
| 2014/0049653 A1 | 2/2014 | Leonard et al. | |
| 2015/0213324 A1 | 7/2015 | Farid et al. | |
| 2015/0363893 A1 | 12/2015 | Saft et al. | |
| 2017/0004295 A1* | 1/2017 | Kim | G06F 21/32 |
| 2017/0236034 A1* | 8/2017 | Dolev | G06K 9/6203 |

OTHER PUBLICATIONS

"OPV Image Specification", retrieved on: Apr. 13, 2016, Available at: http://www.opv.se/Upload/Documents/OPV_bildspec_eng.pdf, 2 pages.

Qureshi, et al., "A Review on Copy Move Image Forgery Detection Techniques", In Proceedings of 11th International Multi-Conference on Systems, Signals & Devices, Feb. 11, 2014, pp. 1-5.

"The Cantadora", Retrieved on: Apr. 15, 2016, Available at: https://hackathon.eventpoint.com/p/hackathon/resources/CANTADORA%20ONEWEEK%20STORYTELLING%20SUITE.pdf, 18 pages.

PCT/US2017/036935—International Search Report and Written Opinion, dated Jul. 28, 2017, 15 pages.

"Office Action Issued in Colombian Patent Application No. NC2018/0013670", dated Jan. 13, 2020, 11 Pages.

* cited by examiner

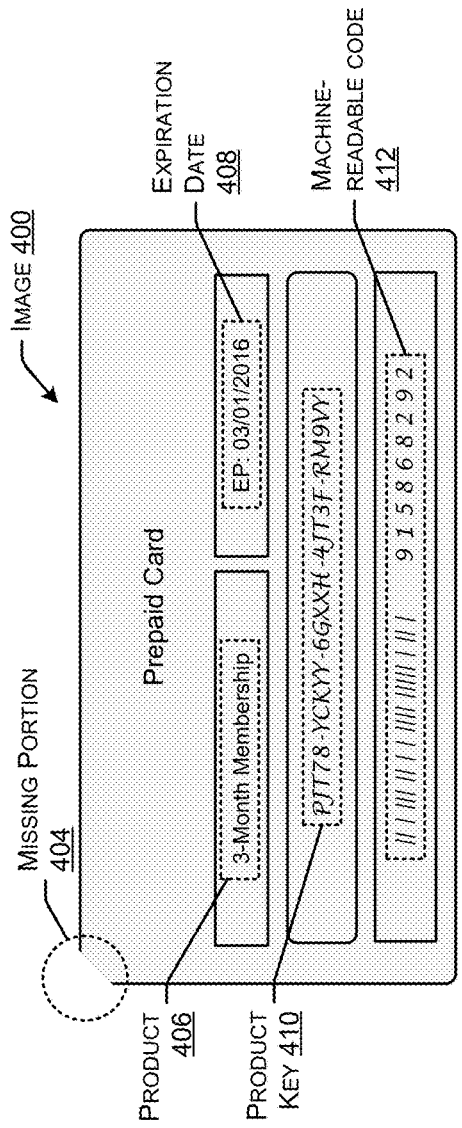
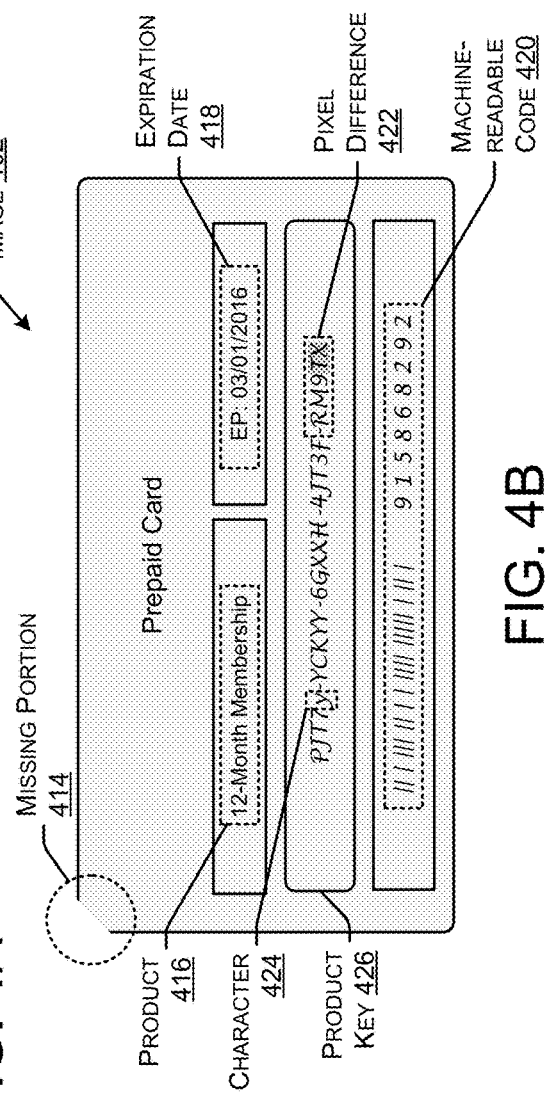

AUTOMATION OF IMAGE VALIDATION

BACKGROUND

Many businesses have customer support systems where customers regularly provide photographs or images to support agents to prove their eligibility for support, refund, or other concessions. However, if the images provided to the support agents have been fraudulently modified, the customer could receive support or concessions that the customer is not eligible for. Currently, businesses must verify an image either by manually confirming the validity of the image with the document creator, or by running a sophisticated image forensics process. However, these techniques require a large amount of time and/or computing resources, resulting in poor customer service or in additional costs for businesses who provide support or concessions to customers who are not eligible for the support or concessions.

SUMMARY

This disclosure describes techniques for performing an automated process for identification of original, non-modified images. The techniques described herein include performing a multi-factor analysis on an image to determine a likelihood that an image or a subject depicted in the image has been modified, and outputting a result indicating the likelihood that the image or the subject depicted in the image has been modified. In some examples, an electronic portal (e.g., web application, Internet site, etc.) is presented on a computing device to receive an image. For instance, a customer support agent may access a web application via a host computing device and submit an image provided to them from a customer. In other examples, the user may submit the image directly (e.g., in a self-service example). The web application may send the image to an image validation system, such as by calling a web-based Application Program Interface (API) associated with the image validation system. The image validation system may receive the image for verification and perform a multi-factor analysis on the image using various modification/tampering indicators to determine a likelihood that the image (and/or the subject depicted in the image) has been modified from its original form. The modification indicators may include any type of operation demonstrating that modification of an image has occurred, such as analyzing the image to detect a change in pixel density between various portions of the image, comparing the image to a thumbnail of the image to detect differences, analyzing metadata of the image to determine whether image editing software has been used on the image, analyzing metadata of the image to identify a time at which the image was captured or a geographic location at which the image was captured, and so on. One or more of the various modification indicators may be used to determine a likelihood that the image (or subject of the image) was modified. In some instances, the various modification indicators may be weighted more or less heavily when determining the likelihood that the image was modified. Once the image validation service has determined the likelihood that the image has been modified, it may output an indicator of the likelihood that the image has been modified. For instance, the image modification system may output an indication that tampering has occurred, tampering is probable, or tampering has not occurred. In some examples, the indication of the likelihood that modifying or tampering has occurred may be output, or sent, to the computing device hosting the web application, which in turn may cause the result to be presented in a user interface of the web application accessed via the computing device. In this way, a customer service agent may be apprised of the likelihood that the image has been modified and take an appropriate action, such as rejecting the customer's request for support or concessions outright, requesting additional information from the customer to determine eligibility for support or concession, or providing the customer with the support or concessions for which they are eligible.

In some examples, the techniques described herein further include storing information in cloud-based storage. The images may be stored in the cloud-based storage either before the images are sent to the image validation service, or after the image validation service has analyzed the images. In some examples, additional Information may be stored in the cloud-based storage along with the image. For instance, results of the analysis performed by the image validation service and/or the indication of the likelihood of modification may also be stored and associated with a particular image. In some examples, stored images that were previously received via the web application and analyzed by the image validation service may provide for additional modification indicators. For example, the image validation service may compare a particular image with previously stored images, or have another process/service compare the images and return results. The comparison may indicate various relationships between previously stored images and the particular image currently being analyzed that may suggest modification of the image. For example, if the particular image has more than a threshold amount of similarities with other stored images, this may suggest tampering of the particular image because it may simply be a modified version of a previously stored image for which support was requested. Thus, the techniques described herein automate verification of images by implementing a process to analyze received images using a multi-factor analysis, and determine a likelihood that the image has been modified from its original form.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIGS. 4A and 4B are example diagrams of a stored image and an image to be analyzed using one or more indicators to determine a likelihood that the image has been modified.

DETAILED DESCRIPTION

Figure 1:
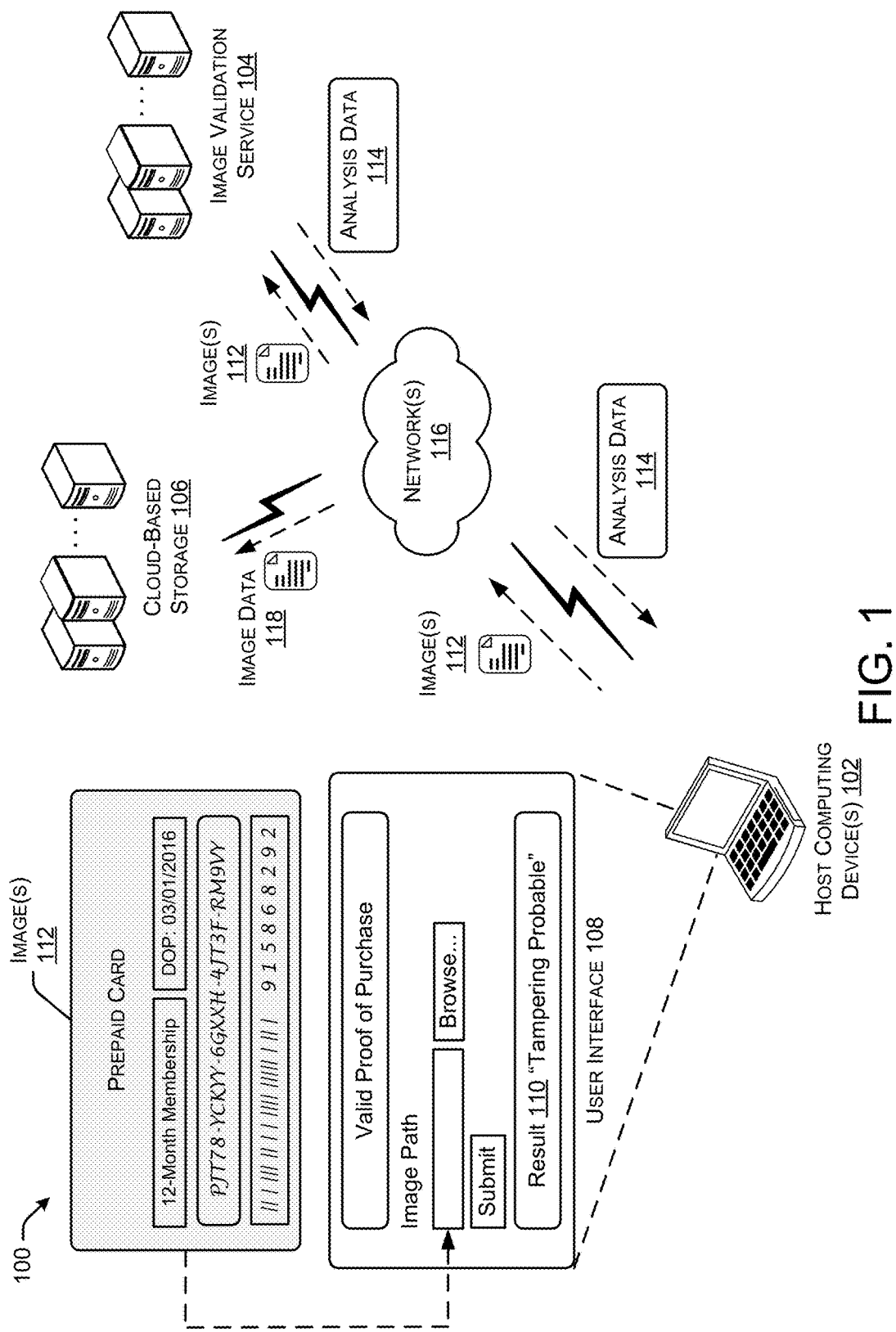
FIG. 1 is a schematic diagram showing an example environment for receiving an image for which support is requested, and analyzing the image to determine a likelihood that the image has been modified from its original form.

This disclosure describes techniques for performing a process for determining a likelihood that an image has been tampered with or modified from its original form. Many businesses have customer support systems where customers provide electronic or digital images (i.e., photographs, scanned images, etc.) to customer support agents to prove eligibility for support, refunds, or other concessions. For example, customers may provide images of prepaid cards that are allegedly not working properly, or images of receipts showing dates of purchase for products or warranties that a customer is trying to prove, in order to receive support or concessions from the business. However, customers may submit fraudulent images, or modified images, to attempt to gain support and/or concessions for which the customers are not eligible. Supporting these fraudulent claims from customers or providing concessions to ineligible customers may cost businesses substantial amounts of time and resources, such as time to manually check validity of warranties with original sellers, or costs for providing refunds for products or services that are ineligible for refund.

The techniques described herein provide a portal, such as a web application, that receives an image to be verified or authenticated, and submits the image to an image validation service to analyze the image and provide an indication of a likelihood that the image has been modified. In some examples, the image validation service may additionally or alternatively analyze the image to determine a likelihood that a subject (e.g., gift card, receipt, proof of purchase, etc.) depicted in the image has been modified. In some examples, the web application may be hosted on a computing device, such as a host computing device operated by a support agent or a customer. The web application may be a downloadable application that is used by consumers, or an application provided to support agents of a business to verify images received from customers. In some examples, a support agent may receive an image from a customer, such as by email, text, web portal, or some other electronic portal, and upload the image via a user interface of a web application to determine whether the image has been modified, and/or whether a subject depicted in the image has been modified. In various examples, the web application may send the image to an image validation service. For instance, the web application may call a web API which sends the image to the image validation service. Additionally, the web application may store the image in a database, such as a cloud-based storage, for later comparison with other images.

Upon receiving the image, the image validation service may analyze the image using one or more modification indicators to determine whether the image has been modified from its original form, or whether a subject depicted in the image has been modified. In some examples, the indicators may include various tampering or modification tests, such as analyzing the image to detect a change in pixel density between various portions of the image (especially near "sensitive" regions, such as machine-readable codes, product keys, price, dates, etc.), comparing the image to a thumbnail of the image to detect differences indicating modification, and/or comparison to other stored images to determine if the images have a threshold amount of similarity. These and other indicators may suggest that the image was modified. For instance, if pixel changes are detected in an image, that may suggest the image was edited in certain regions resulting in different pixel densities, or that the subject (i.e., document) contained in the image was modified (e.g., white-out, tape, etc.). In another instance, if an image has a threshold amount of similarity to another stored image, this may suggest modification of the image because the image is substantially similar to, or the same as, another image that has already been analyzed, which may indicate that the image has been previously used by a customer to gain concessions or support. Additionally, or alternatively, the validation search service may compare the image at runtime with images on the web, such as images that can be found using online search services (e.g., BING®, GOOGLE®, etc.), which may indicate that the image has been modified.

In some examples, the image validation service may additionally perform data extraction techniques on the image to extract metadata of the image for use as modification indicators. In some examples, the data extraction may reveal that metadata of the image does not exist, or has been wiped clean, which may indicate that the image has been modified. In some examples, the metadata may be compared to metadata of other stored images to determine if the different metadata resembles each other, which may indicate that the images are the same and that modification has occurred. In some examples, the extracted metadata may show evidence of editing by a software client (e.g., PHOTOSHOP®, Gimp, Sketch, etc.), which may indicate modification of the image. In various examples, the metadata may further indicate a device associated with the image, such as a device identification (ID) of a computing device that sent the image, an Internet Protocol (IP) address associated with the computing device that captured the image or sent the image, and/or a geographic location at which the image was captured, or from which the image was sent. Using this computing device identification information, an image may be flagged as likely being modified because that computing device previously submitted a fraudulently modified image, the computing device is located at a location from which fraudulent images have previously been submitted, the image was captured at a location at which fraudulent images have previously been captured, or the like. In other examples, the metadata may further include date information, such as a date that the image was captured. The image that the date was taken may be compared with other dates, such as the date the product or warranty was allegedly purchased, to determine whether the image has been modified, or whether a subject depicted in the image has been modified. For example, if an image was created at a date prior to the alleged date of purchase of the product or warranty, this may suggest the image has been modified as the consumer would be unable to create an image of the product or warranty prior to the date of purchase.

In some examples, the data extraction may include performing optical character recognition (OCR) analysis on the image to extract text from the image. The text may be used as indicators of whether the image has been modified. For instance, if the text contains characters that are not used for product keys, or if the product key characters are not arranged in a format that product key characters traditionally are (e.g., 5×5, 4×4, etc.), the text may indicate that the image has been modified. Similarly, machine-readable code (e.g., barcode, QR code, watermark, etc.) in the image may be compared to authorized products (i.e., products listed as sold in a merchant's database) to determine whether the machine-readable code is associated with a product that was actually sold. If the machine-readable code is on a receipt indicating a date and business location where a product was purchased, but the database for the business does not show that particular machine-readable code as being associated with a sold product, this may indicate modification of the image.

In some examples, the image validation service may determine a likelihood that the image has been modified based on one or more of the above indicators. In various examples, the indicators may be weighted more or less heavily when used to determine the likelihood that the image has been modified. For example, an indicator such as the metadata showing evidence of editing by a software client may be weighted more heavily to show modification of an image than an indicator such as pixel variation in the image. Based on the various indicators, or various weighted indicators, the image validation service may determine a likelihood that the image has been modified. For instance, the indicators may indicate a likelihood that falls within various thresholds and indicate one or more results such as tampering is detected, tampering is probable, or inconclusive because there is no clear evidence of tampering. The image verification service may then return the results of the analysis to the web application. For instance, the image verification service may output to the web application one or more of the likelihood that the image was modified, the analysis and indicators used to determine the likelihood, and/or the metadata that was extracted from the image.

The web application may output the indication of the likelihood that the image has been modified. For instance, the web application may present the indication of the likelihood that the image has been modified on a display of the host computing device to inform the support agent or other user the likelihood that the image was modified. Further, the web application may present suggested tasks or actions, or perform tasks or actions, based on the indication of the likelihood that the image has been modified. For example, if tampering has been detected, an automated process may be used to notify the customer that the image is not accepted or has been flagged for fraud and reject the request for support or concessions. In another example, if tampering is probable but not certain, the web application may request additional information from the support agent or the customer, such as images of the document at issue taken from different angles, or a video of the document from different angles, to help determine whether modification has occurred. Because modification is performed using editing software after the image is created, it may be difficult for a fraudster to recreate the exact modifications on the image from different angles of the document.

In various examples, the web application may cause one or more of the image, the indication of the likelihood of modification, the indicators used in the analysis, and/or the metadata of the image to be stored in a cloud-based storage, such as in Binary Large OBject (BLOB) storage. For instance, the web application may send any of the above data to the BLOB storage. The data may be indexed or organized such that the information is associated with the appropriate image. In this way, images stored in the BLOB storage and their associated data may be used by the image validation service, or another process, to determine whether a particular image has been modified, or whether a subject depicted in the image has been modified.

While the techniques described herein are described as being performed by an image validation service, a web application, and cloud-based storage, the techniques can be performed by a single computing device or entity, or any combination of computing devices and entities.

Illustrative Environments

FIG. 1 is a schematic diagram showing an example environment 100 for receiving an image for which support is requested, and analyzing the image to determine a likelihood that the image has been modified from its original form. More particularly, the example environment 100 may include one or more host computing device(s) 102, an image validation service 104, and a cloud-based storage 106.

The host computing device(s) 102 may comprise any type of entity, server, console, computer, etc., configured with one or more modules configured to present a user interface 108 on a display associated with the host computing device(s) 102 to receive an image, send the image to the image validation service 104, and present a result 110 of analysis performed by the image validation service 104. The host computing device(s) 102 may comprise any type of computer, such as a laptop computer, desktop computer, smart phone computing device, or any other type of computing device, that may be operated by an entity such as a support agent. The host computing device(s) 102 may execute a web-based application which presents the user interface 108 to receive one or more images 112. In some examples, a customer may access the web-based application and upload the image(s) 112 directly to be verified. The image(s) 112 may comprise any type of image in electronic or digital form, such as a photograph or a scanned image. As shown in FIG. 1, the image(s) 112 is an image of a document (i.e., prepaid card, receipt, warranty, etc.) for which a consumer may be attempting to obtain support or concessions. Once the image(s) 112 has been submitted via the user interface 108 of a web application hosted on host computing device(s) 102, the host computing device(s) 102 may send the image(s) 112 over one or more network(s) 116 to the image validation service 104. In some examples, the host computing device(s) 102 may send the image by calling a web API associated with the image validation service 104 to have the image validation service perform an analysis on the image(s) 112. In some examples, the host computing device(s) 102 may additionally send the image(s) 112 to the cloud-based storage 106 to be stored for later use.

The network(s) 116 may include any one of or a combination of multiple different types of networks, such as cellular networks, wireless networks, Local Area Networks (LANs), Wide Area Networks (WANs), Personal Area Networks (PANs), and the Internet.

The image validation service 104 may be any entity, server, console, computer, etc., configured with one or more modules for analyzing the image(s) 112 using one or more indicators to determine whether the image(s) 112 has been modified, or whether a subject depicted in the image(s) 112 has been modified. In some examples, the host computing device(s) 102, the web service, and the image validation service 104 could all be one computing device or one entity. The image validation service 104 may include one or more modules for extracting metadata from the image(s) 112 for use as indicators for determining whether the image(s) 112 has been modified. In some examples, the indicators may include various tampering or modification tests, such as analyzing the image to detect a change in pixel density between various portions of the image, comparing the image to a thumbnail of the image to detect differences indicating modification, comparison to other stored images to determine if the images have a threshold amount of similarity, information indicating a source of the image, evidence of editing software shown in metadata of the image, and/or various text analyzing techniques. These and other indicators, described in more detail with respect to FIGS. 4A and 4B, may suggest that the image was modified. Based on the analysis of the image(s) 112 using the various indicators, the image validation service 104 may determine a likelihood that the image has been modified based on one or more of the above indicators. For instance, the indicators may indicate a likelihood that falls within various thresholds of likelihood and indicate one or more results, such as tampering is detected, tampering is probable, or inconclusive because there is no clear evidence of tampering. The image verification service 104 may then return the results of the analysis to the host computing device(s) 102. For instance, the image verification service 104 may output analysis data 114 to the web application hosted on the host computing device(s) 102, where the analysis data 114 includes one or more of the likelihood that the image(s) 112 was modified, the analysis performed and indicators used to determine the likelihood, and/or the metadata that was extracted from the image(s) 112.

The user interface 108 may present the likelihood that the image(s) 112 was modified as result 110 on a display associated with the host computing device(s) 102. For example, the user interface 108 may present the result "Tampering Probable," or any other result returned from the image validation service 104.

In some examples, the host computing device(s) 102 may store image data 118 in the cloud-based storage 106. For example, the web application on the host computing device(s) 102 may cause image data 118 to be sent to the cloud-based storage 106. In some examples, the image data 118 may include the image(s) 112 and/or any information contained in the analysis data 114, such as the likelihood that the image(s) 112 was modified, the analysis performed and indicators used to determine the likelihood, and/or the metadata that was extracted from the image(s) 112. As noted above, the cloud-based storage 106 may be any type of storage, such as BLOB storage where the image data 118 is stored. The image data 118 may be stored in various formats, such as in JavaScript Object Notation (JSON) or Extensible Markup Language (XML). In some examples, the cloud-based storage 106 may organize the image data 118 such that the image(s) 112 is indexed or otherwise associated with its respective analysis data 114. In this way, the image data 118 for a particular image(s) 112 may be easily accessible for analysis. The image validation service 104 may include, or request, a web-based service to analyze the image data 118 stored in the cloud-based storage 106 and return results for use as indicators of whether an image has been modified. For example, the image validation service 104 may store or call a web service or process to determine whether a particular image(s) 112 being analyzed has similarities with other images or other metadata stored in the cloud-based storage 106. Similarities between previously stored images may be used as indicators of whether a particular image(s) 112 being analyzed by the image validation service 104 has been modified.

While the example environment 100 is depicted in FIG. 1 as including a host computing device(s) 102, an image validation service 104, and a cloud-based storage 106 as separate entities, in various implementations, any different combination of entities may perform the described techniques. In some examples, all of the techniques may be performed by a single entity. In various examples, the image validation service 104 and the cloud-based storage 106 may be the same entity or server.

Figure 2:
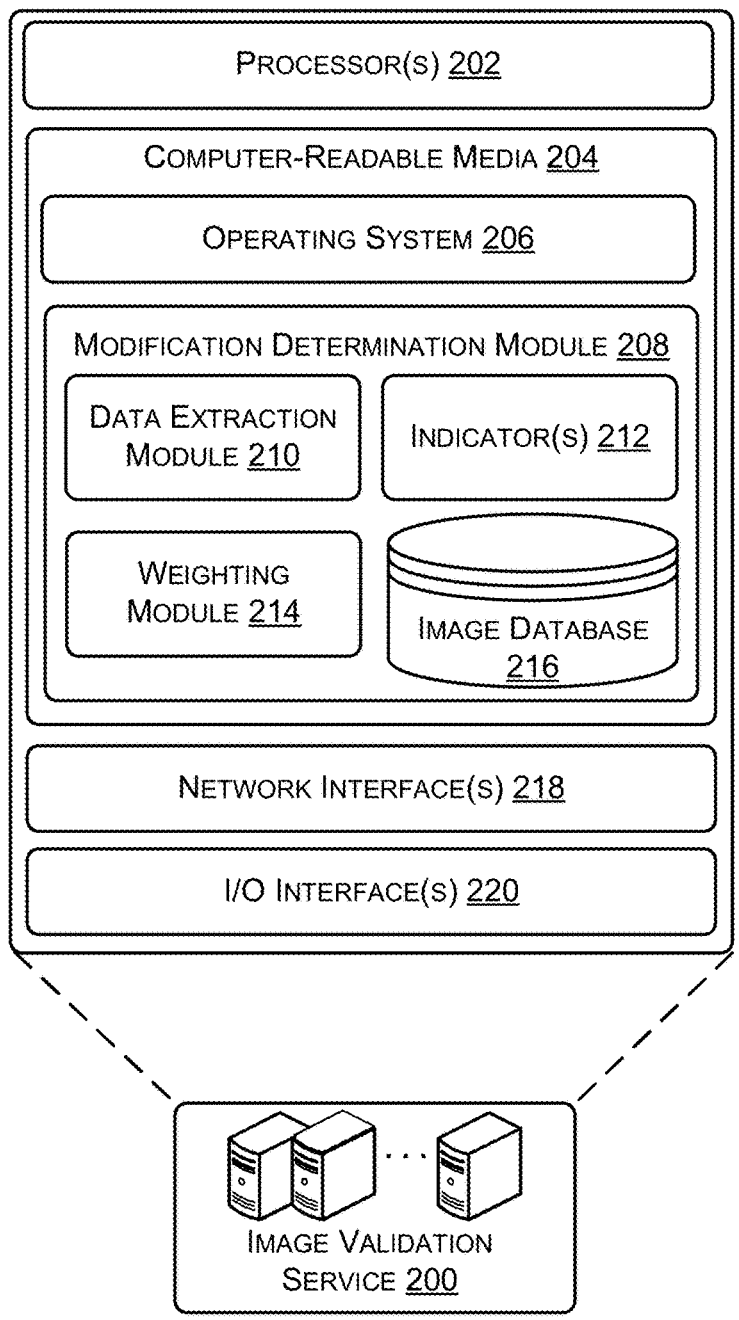
FIG. 2 is a schematic diagram showing an example image validation service to perform various operations for analyzing an image using multiple modification indicators to determine a likelihood that the image has been modified from its original form.

FIG. 2 is a schematic diagram showing an example image validation service 200 to perform various operations for analyzing an image using multiple modification indicators to determine a likelihood that the image has been modified from its original form. The image validation service 200 may comprise any type of image validation service, such as image validation service 104, and be any type of computing device or combination of computing devices, such as an online server, configured with one or more modules to determine whether an electronic image has been modified from its original form, or whether a subject depicted in the digital image has been modified. As shown in FIG. 2, image validation service 200 may include one or more processors 202 coupled to computer-readable media 204, such as by a communication bus. The processor(s) 202 may include a central processing unit (CPU), graphics processing unit (GPU), a microprocessor, and so on.

Computer-readable media 204 may store an operating system 206 and a modification determination module 208. The operating system 206 may include computer-readable instructions that manage hardware and software resources of the controller server 200.

The modification determination module 208 may include computer-readable instructions that, when executed by the processors(s) 202, perform various operations for determining whether an image has been modified from its original form. Additionally, or alternatively, the modification determination module 208 may determine whether a subject (i.e., gift card, receipt, etc.) depicted in the image has been modified. For example, the modification determination module 208 may include one or more modules to obtain an image (e.g., receive an image, access a stored image, etc.), extract data from the image, and analyze the image using various indicators.

In some examples, the modification determination module 208 may include a data extraction module 210 which may include computer-readable instructions that, when executed by the processors(s) 202, perform various operations for extracting data from an image. In some examples, the data extraction may include computer-readable instructions for performing optical character recognition (OCR) techniques to extract or determine text included in the image. In some examples, the data extraction module 210 may further extract metadata from the image file, such as temporal data indicating a time when the image was captured, geographical data identifying a location where the image was captured, evidence of editing software used on the image, or device identification information such as a device ID of the particular device that created and/or sent the image for analysis, an IP address of the particular device, and/or a geographic location of the particular device.

In some examples, the modification determination module 208 may include indicator(s) 212 which may include computer-readable instructions that, when executed by the processors(s) 202, perform various operations for analyzing an image and data associated with the image to determine a likelihood that the image was modified from its original version. For example, the indicators may be associated with operations such as (i) analyzing the image to detect a change in pixel density in various portions of the image, (ii) comparing the image to a thumbnail of the image to detect a difference between the image and the thumbnail, (iii) analyzing data associated with the image to determine whether image editing software has been used on the image, (iv) analyzing data of the image to identify at least one of a time the image was captured or a geographic location at which the image was captured, (v) determining that machine-readable code (e.g., barcodes, Quick Response (QR) codes, watermarks, etc.) included in the text of the image is associated with a particular product, (vi) determining that a product key included in the text of the image is in an appropriate format for product keys, (vii) determining that a product key included in the text of the image includes invalid characters, and/or (vii) analyzing a comparison between the image and a stored image to identify similarities between the image and the stored digital image. Further description of the various indicators can be found below with reference to FIGS. 4A and 4B. One or more of the indicator(s) 212 may be used by the modification determination module 208 to determine a likelihood that the image has been modified from its original form.

In various examples, the modification determination module 208 may include a weighting module 214 which may include computer-readable instructions that, when executed by the processors(s) 202, perform various operations for weighting one or more of the indicator(s) 212. The weighting module 214 may weight some indicator(s) 212 more heavily as those particular indicators may show a stronger likelihood of modification of an image than other indicator(s) 212 that are weighted less heavily. For example, an indicator such as analyzing the image to determine that editing software has been used on the image may be weighted more heavily with a weighting factor than an indicator demonstrating that the particular device ID of the computing device that submitted the image has submitted a modified image in the past. The weighting module 214 may apply any variety and combination of weighting factors to the indicator(s) 212 in various embodiments.

In some examples, the modification determination module 208 may further include an image database 216 that stores images to be analyzed, or already analyzed, by the modification determination module 208. The image database 216 may comprise any type of storage medium, such as cloud-based storage 106. In some examples, the image database may additionally store image data for a respective image, such as the likelihood that the particular image was modified, the analysis data and indicators used for the particular image, and/or the extracted metadata of the image. The image data may be indexed or otherwise associated with the image. In some examples, the modification determination module 208 may include an indicator(s) 212 that analyzes a comparison between images stored in the image database 216 and an image currently being analyzed. The modification determination module 208 may in some examples call or request a process or entity exterior to the image validation service 200 to perform the comparison between the stored images and currently analyzed images, which returns comparison results to the modification determination module 208 indicating any similarities between the analyzed images. In some instances, the image database 216 may be a separate entity from the image validation service 200.

The image validation service may further include the network interface(s) 218 (i.e., communication connections) to send and receive data over one or more networks. Network interface(s) 218 may include one or more network interface controllers (NICs) or other types of transceiver devices to send and receive communications over a network, such as network(s) 116. For example, network interface(s) 218 may receive images to be analyzed to determine if the images have been modified, and send an indication of a likelihood that the image has been modified along with image analysis data. In some examples, the network interface(s) 218 may allow the image validation service 200 to access an image over a network rather than receiving the image over a network.

The image validation service 200 may additionally include one or more input/output (I/O) interfaces 220 to allow the image validation service 200 to communicate with other devices such as input peripheral devices (e.g., a keyboard, a mouse, a pen, a game controller, a voice input device, a touch input device, a gestural input device, a tracking device, a mapping device, a visual content item camera, a depth sensor, a physiological sensor, and the like) and/or output peripheral devices (e.g., a display, a printer, audio speakers, a haptic output, and the like). In this way, users (i.e., administrators) of image validation service 200 may interact with the image validation service 200 to perform various operations, such as updating computer-readable instructions stored on the image validation service 200.

Figure 3:
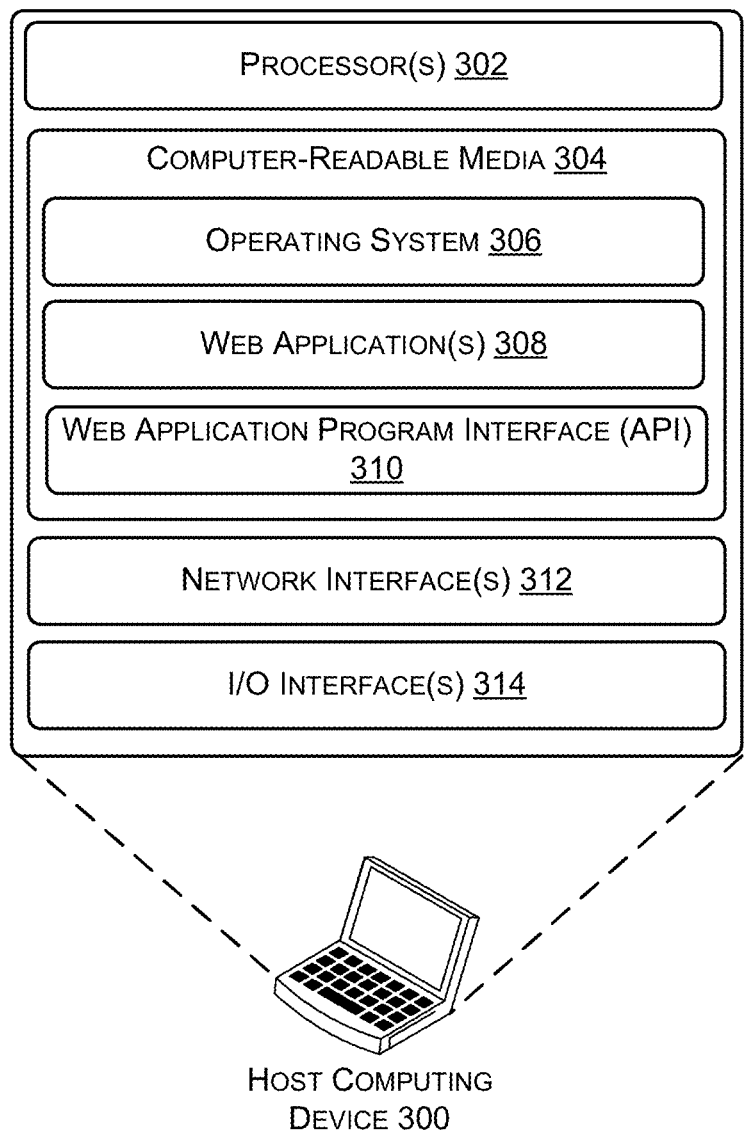
FIG. 3 is a schematic diagram showing an example host computing device for executing a web application to receive an image and output results indicating a likelihood that the image has been modified from its original form.

FIG. 3 is a schematic diagram showing an example host computing device 300 for executing a web application to receive an image and output results indicating a likelihood that the image has been modified from its original form. The host computing device 30 may comprise any type of computing device, such as host computing device(s) 102. In some examples, host computing device 300 may be a computing device operated by a support agent of a customer support service who submits images received from customers attempting to gain support and/or concessions for products or services. In other examples, the host computing device 300 may comprise a customer computing device, such as a personal computer or a mobile phone.

The host computing device 300 may include one or more processors 302 communicatively coupled to computer-readable media 304, such as by a communication bus. The processor(s) 302 may include a central processing unit (CPU), graphics processing unit (GPU), a microprocessor, and so on. Computer-readable media 304 may store an operating system 306, one or more web-applications 308, and a web application program interface (API) 310. The operating system 306 may include computer-readable instructions that manage hardware and software resources of the host computing device 300.

In some examples, the web application(s) 308 may comprise computer-readable instructions that, when executed by the processor(s) 302, perform operations for receiving an image. For example, the web application(s) 308 may present a user interface, such as user interface 108, to receive submissions or images to be analyzed by an image validation service. The web application(s) 308 may comprise a web portal that receives the image via a user interface, and in response to receiving the image, calls or requests the web API 310 to analyze the image to determine a likelihood that the image has been modified. In some examples, API 310 may be associated with an image validation service, such as image validation services 104 and/or 200.

The web application(s) 308 may additionally send data to be stored in cloud-based storage (i.e., cloud-based storage 106). For example, upon receiving the image, the web application(s) 308 may send the image to cloud-based storage to be stored for later use and analysis. Additionally, the web application(s) 308 may receive analysis data from the image validation service along with the indication of the likelihood that the submitted image was modified. The web application(s) 208 additionally cause this analysis data to be sent and stored in the cloud-based storage and indexed or otherwise associated with the respective image.

In various examples, the user interface of the web application(s) 308 may present the indication of the likelihood that the image was modified. For example, the user interface of the web application(s) 308 may present an indication that tampering has occurred, tampering is probable, or tampering has not occurred.

In various examples, depending on the indication of the likelihood that tampering has occurred, various actions or suggestions may be output from the web application(s) 308. For example, the web application(s) 308 may request photographs of an image from different angles when an indication of likelihood shows that tampering is probable, but more evidence is needed. The web application(s) 308 may suggest support or concessions when the indication of the likelihood that modification has occurred indicates that tampering has not occurred. Alternatively, the web application(s) 308 may suggest or take actions such as performing an automated rejection process when the likelihood of modification indicates that tampering has occurred. These and other suggestions and actions may be performed by the web application(s) based on the likelihood that modification has occurred on the image.

The host computing device 300 may further include one or more network interfaces 312 (i.e., communication connections) to send and receive data over one or more networks. Network interface(s) 312 may include one or more network interface controllers (NICs) or other types of transceiver devices to send and receive communications over a network, such as network(s) 116. For example, network interface(s) 312 may send images over a network to an image validation service to analyze the image to verify that the image has been modified. In some examples, the network interface(s) 312 may receive data, such as analysis data, over the network from various computing devices, such as an image validation service.

The host computing device 300 may additionally include one or more input/output (I/O) interfaces 314 to allow the host computing device 300 to communicate with other devices such as input peripheral devices (e.g., a keyboard, a mouse, a pen, a game controller, a voice input device, a touch input device, a gestural input device, a tracking device, a mapping device, a visual content item camera, a depth sensor, a physiological sensor, and the like) and/or output peripheral devices (e.g., a display, a printer, audio speakers, a haptic output, and the like). For example, the I/O interfaces 314 may include a display to present a user interface of the web application(s) 308 according to the techniques described herein.

The computer-readable media 204 and 304 can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media.

In some examples, processor(s) 202 and 302 can represent, for example, a CPU-type processing unit, a GPU-type processing unit, a HPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In various examples, the processor(s) 202 and 302 can execute one or more modules and/or processes to cause the image validation service 200 and host computing device 300 to perform operations for obtaining an image, analyzing the image to determine whether the image has been modified, and outputting an indication of a likelihood that the image has been modified. Additionally, each of the processor(s) 202 and 302 may possess their own local memory, which also may store program modules, program data, and/or one or more operating systems.

Example Diagrams

FIGS. 4A and 4B are example diagrams of a stored image and an image to be analyzed using one or more indicators to determine a likelihood that the image has been modified.

FIG. 4A is an example image 400, such as an image that has previously been analyzed by an image validation service. In some examples, the image 400 may alternatively be a thumbnail for another image, such as image 402. As shown in FIG. 4A, the image 400 may comprise an electronic representation of an object, such as a prepaid card. The image 400 of FIG. 4A has various characteristics that have been determine by an image validation service, such as a missing portion 404, a product 406, an expiration date 408, a product key 410, and a machine-readable code 412 (e.g., barcode, QR code, etc.). As explained above with reference to FIG. 2, the modification determination module 208 may include a data extraction module 210 which performs various techniques, such as OCR techniques, to extract text and other information from an image.

FIG. 4B is an example image 402 that similarly contains a missing portion 414, a product 416, an expiration date 418, and a machine-readable code 420. The text of the image may be extracted or identified by the data extraction module 208, such as by OCR techniques. Generally, the product 416 may indicate a product or service that is provided by the prepaid card in image 402, such as a 3-month or 12-month membership or subscription to a particular service (e.g., online gaming, music library access, etc.). The expiration date 418 may indicate a date when the prepaid card is no longer valid, and the machine-readable code 420 is a machine-readable representation of data associated with the prepaid card.

In various examples, once the data extraction module 208 has extracted text and/or metadata of the images 400 and 402, the modification determination module 208 may apply various indicators, such as indicator(s) 112, to the text and metadata to determine a likelihood that the image 402 has been modified from its original form. For example, the modification determination module 208 may analyze the image and identify a pixel difference 422 that demonstrates a change in pixel density (or other pixel characteristic) from one portion of the image to another. The modification determination module 208 may identify a pixel density shift between portions of the image 402, pixel color discrepancies, or any other type of pixel change between portions of the imaged 402 that may indicate the image 402 has been modified. The change in pixel characteristics may indicate that the image 402 has been edited, such as by having a patch with different data overlaid on a portion of the image 402. Additionally, or alternatively, the pixel difference 422 may indicate that the subject depicted in the image has been modified, such as by having white-out or tape applied to it. In some examples, pixel density associated with difference regions may be particularly important and weighted more heavily as indicating modification, such as pixel changes around product keys, dates, or other sensitive data of the image 402. In some examples, the modification determination module 208 may further identify other indicators in the text of the image 402 that suggest modification. For example, a character 424 may be identified in a portion of the image, such as the product key, which is not appropriate for that portion of the image 402. As shown in image 402, a character 424 has been identified as a lower case "y," but product keys for this type of product 416 may not use lower case characters, which may suggest that the letter was modified or replaced. The use of characters 424 which are invalid for various portions of the image 402 may indicate that the image 402 has been modified.

In examples where image 400 comprises a thumbnail associated with image 402, the thumbnail and image may be compared to determine or identify differences between the two. As shown in FIGS. 4A and 4B, various similarities exist between image 400 and image 402, such as missing portions 404 and 414 and expiration dates 408 and 418. However, various differences exist, such as product 406 and product 416. Generally, a thumbnail comprises a compressed version of an image that is associated with or otherwise stored with the image. The thumbnail may be created when the image is created and resemble features of the image. However, when editing software is used on an image to modify the image, the modifications may not be applied to the thumbnail as well. Thus, differences between the thumbnail image 400 and the image 402 may indicate that the image 402 was modified. Accordingly, because the product 406 of the image 400 differs from the product 416 of the image 402, the modification determination module 208 may determine that these differences indicate or suggest a likelihood that the image 402 has been modified from its original form. For example, a customer may be attempting to obtain a longer subscription to a particular service by modifying the image 402.

As noted above, image 400 may also represent an image that has been previously analyzed by the modification determination module 208, and is stored in a database for later analysis, such as cloud-based storage 106. The modification determination module 208 may access the cloud-based storage 106 and compare image 400 with image 402, or call another web based process or service to access the cloud-based storage 106 and compare image 400 with image 402. The modification determination module 208 may analyze the comparison between image 400 and image 402 to identify similarities between the images. For example, a similarity, such as the missing portions 404 and 414 or machine-readable code 412 and machine-readable code 420, may be identified. If there are similarities between images 400 and 402, or more than a predetermined threshold of similarities, this may indicate that image 402 is a modified version of image 400. If image 402 is a modified version of image 400 that has been previously submitted for support or other concessions, this may further indicate that image 402 is a modified image. For instance, a customer may have saved an image and be attempting to modify the image slightly to gain support or concessions for which they are not eligible. Thus, similarities identified by comparison between previously analyzed images and images being currently analyzed may indicate that an image, such as image 402, has been modified.

In some examples, information in the machine-readable code 420 may be used to determine whether an image has been modified, or whether a subject depicted in the image has been modified. For example, the machine-readable code 420 may include data that indicates the prepaid card in image 402 is a 3-month membership card. However, the product 416 indicates that the prepaid card is a 12-month membership. This discrepancy in product type indicates that product 416 may have been modified by a customer to gain additional concessions. Additionally, the modification determination module 208 may compare the machine-readable code 420 to authorized products to determine whether that particular barcode is from an authorized product. For example, modification determination module 208 may query a database of a merchant who sold the product in image 402 to determine whether the machine-readable code 420 is associated with a valid product or is not found in the database.

In various examples, the format of various portions of the image 402 may be indicators of modification of the image 402. For example, the product key 426 of image 402 may be arranged in a format that is not appropriate for the product 416. In one example, product keys for a 12-month membership product 416 may be arranged in a 4×4 format, whereas the product key 426 is arranged in a 5×5 format. This may indicate that the product key 426 and/or the product 416 has been modified in image 402 based on this key structure discrepancy.

In various examples, the data extraction module 210 may extract other data from image 402. For example, source data indicating the source device of the image 402 may be determined by the data extraction module 210, such as a device ID, an IP address of the device, a geographic area of the device, etc. This information may indicate that the image 402 has been modified. For example, if the source data is associated with a device that has previously submitted modified images, this may indicate that the current image 402 is modified as well, or requires a more in depth analysis. Further, the metadata extracted from image 402 may indicate modification of the image 402. In one example, the data extraction module 210 may compare the metadata of the image 402, or call an outside service or process to compare the metadata of image 402, with metadata of images stored in a database to identify similarities between the metadata. If similarities exist, or similarities over a predetermined threshold exist, this may indicate that the image 402 has been modified from a previously submitted image. In other examples, the metadata of the image 402 may have been wiped or stripped off, which may indicate that the image 402 has been modified as well. As explained earlier, the metadata of image 402 may include evidence of editing software being used on the image 402. The evidence of editing software being used may be a strong indicator of modification of the image 402.

In some examples, various dates associated with the image 402 may indicate modification of the image 402. For example, a date of when the image was captured may be compared with the date of when the product was purchased. If the date the image 402 was created precedes the date of when the product was allegedly purchased by the customer, this may indicate that the image 402 has been modified because the customer did not have possession of the prepaid card in image 402 to create the image of the product prior to the date they allegedly purchased the product.

In various examples, other techniques may be employed by the modification determination module 208 to determine whether the image 402 has been modified, or whether a subject depicted in the image 402 has been modified. For example, error level analysis (ELA) techniques may be used to determine whether a portion of the image 402 is not original or has been edited. The modification determination module 208 may employ ELA techniques to process the image, and output a result where regions that are clearly from a different source than the original image are highlighted, which in turn is used to determine whether the image 402 has been tampered with.

In some examples, the host computing device(s) 102 and/or the image validation service 104 may extract data (i.e., metadata) from other images stored on a submitting computing device (i.e., customer computing device) that has submitted the image 402 to the host computing device(s) 102 for verification to determine whether image 402 has been modified. For example, the host computing device(s) 102 and/or the image validation service 104 may extract metadata associated with other images stored on the submitting computing device. The image validation service 104 may compare the metadata associated with the other images stored on the submitting computing device with the metadata extracted from image 402 to identify differences between the different metadata. Differences detected between the metadata of the images stored on the submitting device and the image 402 submitted for verification may indicate that the image 402 has been verified. As an example, many computing devices store or partition images in different folders, locations, or files on a computing device. An image captured by the computing device may be stored in a "Camera" location or folder, whereas an image that has been downloaded to the computing device (i.e., not captured) may be stored in a "Downloads" location or folder, and a screenshot may be stored in a "Screenshots" folder or location. If the metadata obtained or extracted from the other images stored on the submitting computing device indicate they are stored in the "Camera" folder or location, but the metadata of the image 402 indicates that the image was stored in the "Downloads" folder or location, this difference may indicate that the image 402 was modified as it was not captured by the submitting computing device, but was instead downloaded from a source such as the Internet.

In some examples, the devices used by customers to submit images may indicate modification of the image 402. For example, if a particular customer has previously submitted an image whose metadata indicates it was captured and/or submitted by a first computing device, and the metadata of image 402 indicates that it was captured and/or submitted with a second, different computing device, this may indicate that the image was modified. For instance, the first computing device may be a mobile phone, and the second computing device may be a laptop computer. This may indicate that the image 402 has been modified because a desktop or laptop computer may have image editing software capabilities required to modify the image 402, whereas a mobile phone may not have those capabilities. Thus, a previously submitted image from a customer using a first device different than a second computing device used to submit image 402 may indicate that image 402 was modified.

The modification determination module 208 may employ one or any combination of the above indicators to determine whether image 402 has been modified, or whether a subject depicted in the image has been modified. The indicators may be weighted by the weighting module 214 more or less heavily to show modification of the image 402. The modification determination module 208 may use the various indicators explained above to determine a likelihood that the image 402 has been modified. If the likelihood of modification falls into various thresholds or ranges, then results may be output such as "tampering detected," "tampering probable," or "no tampering detected." While the techniques are explained with reference to a prepaid card, other types of documents in images may be analyzed using similar techniques, such as warranties, receipts, expense reports, etc.

Example Processes

The processes described in FIGS. 5-7 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes described below may be performed by modules stored on one or more of image validation service 200 and/or host computing device 300, such as modification determination module 208 and web application(s) 308.

Figure 5:
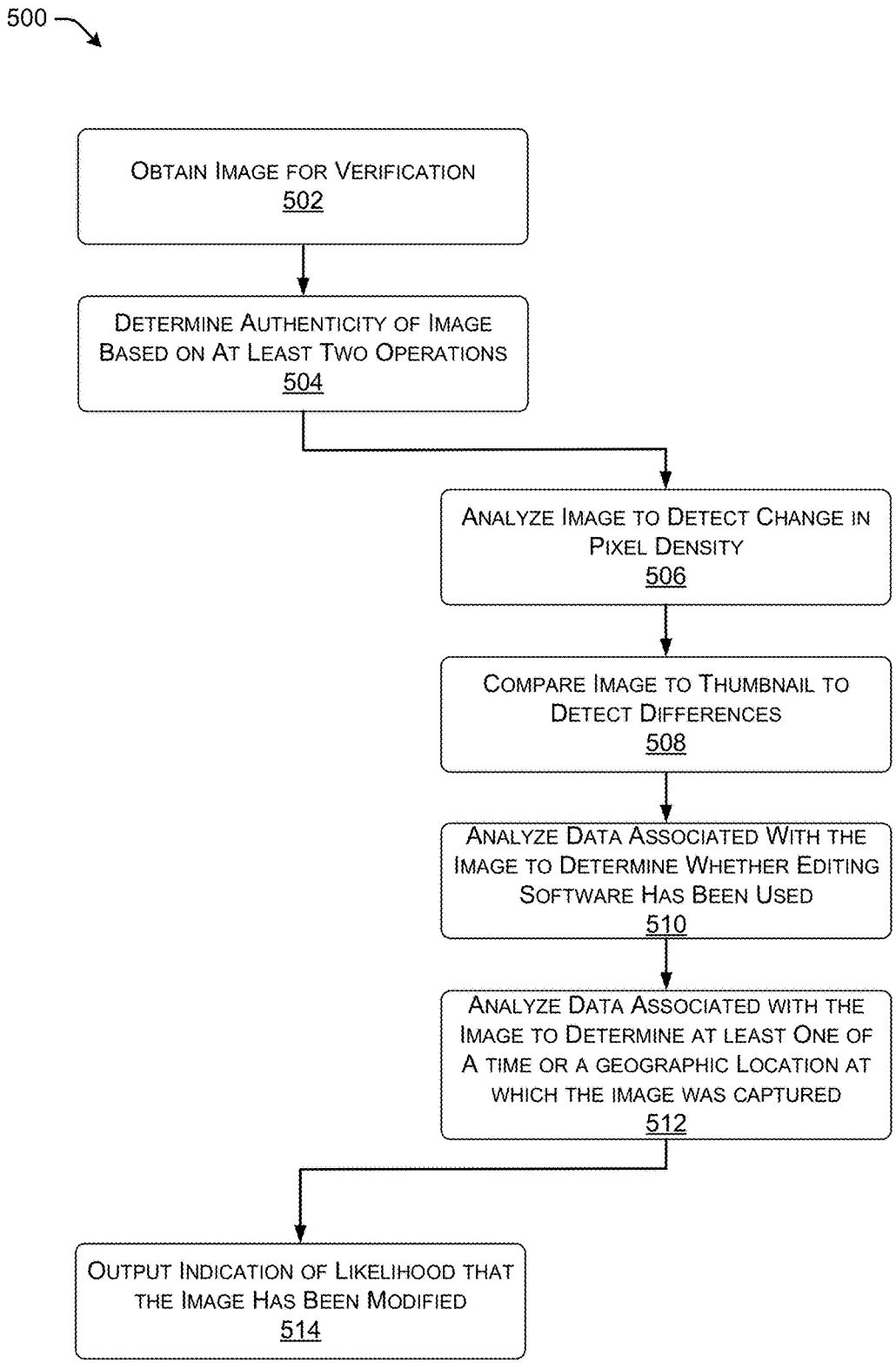
FIG. 5 is a flow diagram showing an example process for determining the authenticity of an image based on indicators and outputting an indication of a likelihood that the image has been modified from its original form.

FIG. 5 is a flow diagram showing an example process 500 for determining the authenticity of an image based on indicators and outputting an indication of a likelihood that the image has been modified from its original form.

At block 502, an image validation service 200 may obtain (e.g., receive, access, etc.) an image for verification.

At block 504, a modification determination module 208 may determine the authenticity of the image based at least on two operations. The operations may include the operations of blocks 506-512.

At block 506, the modification determination module 208 may analyze the image to detect a change in pixel density from a first portion of the image to a second portion of the image.

At block 508, the modification determination module 208 may compare the image to a thumbnail of the image to detect a difference between the image and the thumbnail.

At block 510, the modification determination module 208 may analyze data associated with the image to determine whether editing software has been used on the image.

At block 512, the modification determination module 208 may analyze data associated with the image to determine at least one of a time the image was captured or a geographic location at which the image was captured.

At block 514, the image validation service 200 may output, via one or more network interfaces 218, an indication of a likelihood that the image has been modified. In some examples, the outputting may be based at least in part on the determining the authenticity of the image.

Figure 6:
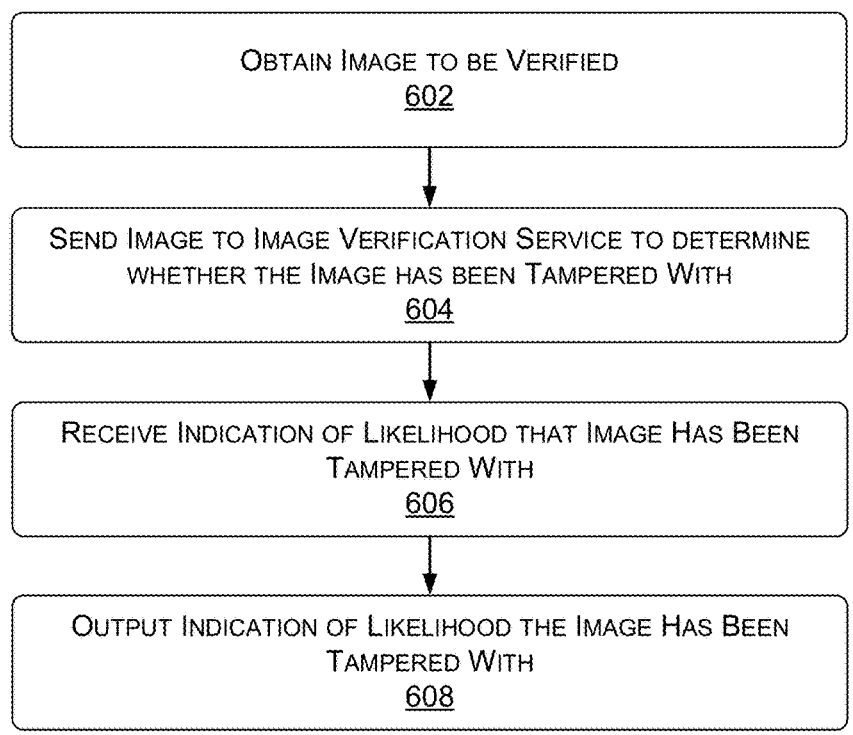
FIG. 6 is a flow diagram showing an example process for obtaining an image to be verified as modified or not, sending the image to be analyzed, and outputting an indication of a likelihood that the image has been modified from its original form.

FIG. 6 is a flow diagram showing an example process 600 for obtaining an image to be verified as modified or not, sending the image to be analyzed, and outputting an indication of a likelihood that the image has been modified from its original form.

At block 602, a host computing device 300 may obtain an image to be verified.

At block 604, the host computing device 300 may send the image, by a web API 310 and via one or more network interfaces 312, to an image verification service to verify the image as being tampered with or not based on a multi-factor analysis.

At block 606, the host computing device may receive, via the one or more network interfaces 312, an indication of a likelihood that the image has been tampered with.

At block 608, the host computing device 300 may output, via a user interface of the web application 308, the indication of the likelihood that the image has been tampered with.

Figure 7:
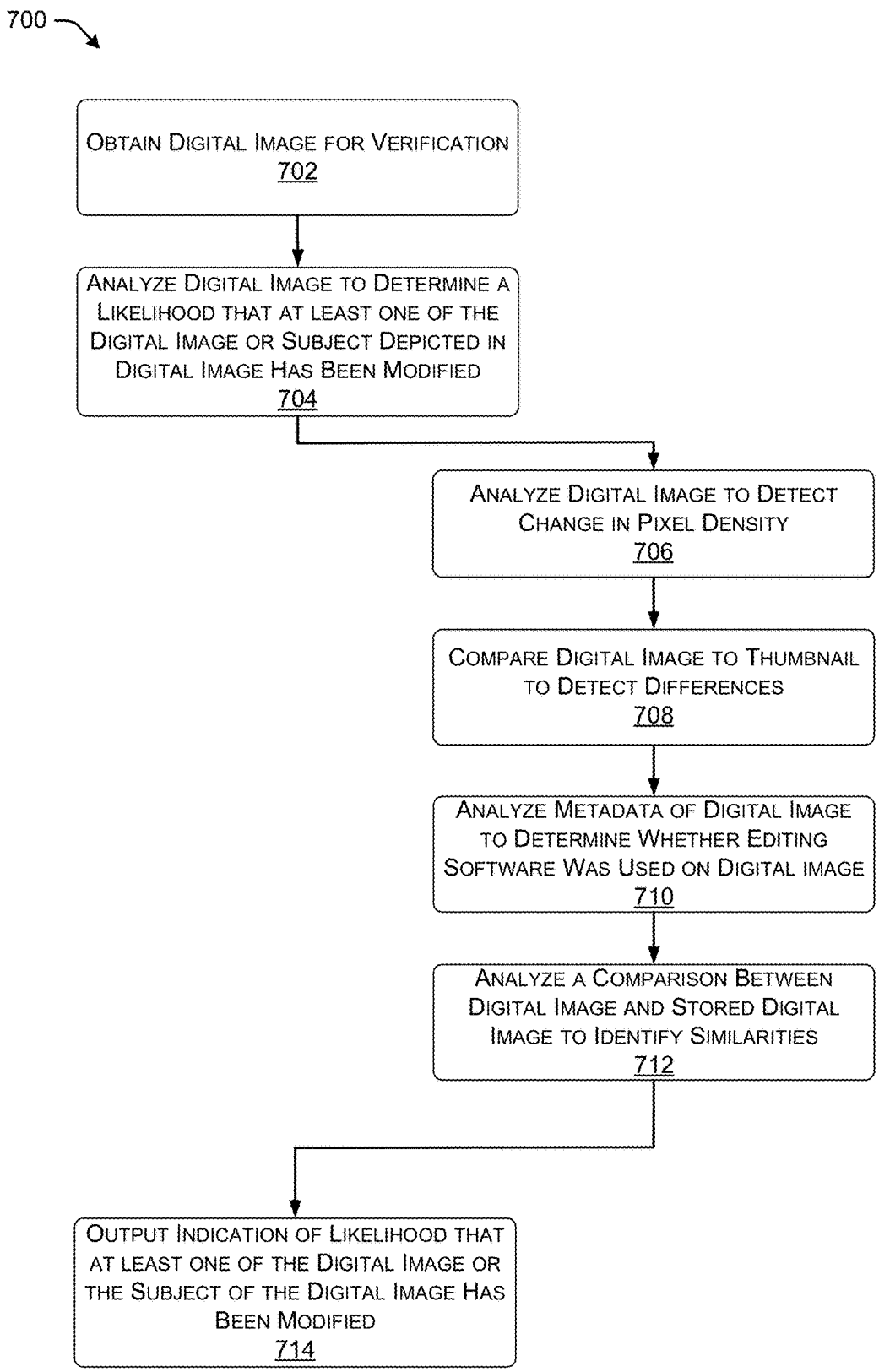
FIG. 7 is a flow diagram showing an example process for analyzing a digital image to determine a likelihood that at least one of the digital image or a subject depicted in the digital image has been modified based on at least two operations, and outputting an indication of the likelihood that the digital image or the subject depicted in the image has been modified from its original form.

FIG. 7 is a flow diagram showing an example process 700 for analyzing a digital image to determine a likelihood that at least one of the digital image or a subject depicted in the digital image has been modified based on at least two operations, and outputting an indication of the likelihood that the digital image or the subject depicted in the image has been modified from its original form.

At block 702, an image validation service 200 may obtain (e.g., receive, access, etc.) a digital image for verification.

At block 704, a modification determination module 208 of the image validation service 200 may analyze the digital image to determine a likelihood that at least one of the digital image or a subject depicted in the digital image has been modified, where the analyzing comprises at least two operations. The operations may include any operations of blocks 706-712.

At block 706, the modification determination module 208 may analyze the digital image to detect a change in pixel density from a first portion of the digital image to a second portion of the digital image.

At block 708, the modification determination module 208 may compare the digital image to a thumbnail of the digital image to detect a difference between the digital image and the thumbnail.

At block 710, the modification determination module 208 may analyze metadata of the digital image to determine whether editing software has been used on the digital image.

At block 712, the modification determination module 208 may analyze a comparison between the digital image and a stored digital image to identify similarities between the digital image and the stored digital image.

At block 714, the image validation service 200 may output an indication, via one or more network interfaces 218, of the likelihood that at least one of the digital image or the subject depicted in the digital image has been modified. In some examples, the image validation service 200 may output the indication based at least in part on the analyzing the digital image.

Example Clauses

A. An image validation system comprising: one or more processors; and memory communicatively coupled to the one or more processors and storing one or more modules that, when executed by the one or more processors, cause the image validation system to perform operations comprising: obtaining, from a computing device, an image for verification; in response to obtaining the image, determining the authenticity of the image based on at least two of the following operations: analyzing the image to detect a change in pixel density from a first portion of the image to a second portion of the image; comparing the image to a thumbnail of the image to detect a difference between the image and the thumbnail; analyzing data associated with the image to determine whether image editing software has been used on the image; and analyzing data associated with the image to identify at least one of a time the image was captured or a geographic location at which the image was captured; and outputting an indication, based at least in part on the determining the authenticity of the image, of a likelihood that the image has been modified.

B. An image validation system as paragraph A recites, the operations further comprising performing optical character recognition on the image to identify text included in the image; and wherein the determining the authenticity of the image further includes: determining that a machine-readable code included in the text of the image is associated with a particular product; determining that a product key included in the text of the image is in an appropriate format for product keys; and determining that the product key included in the text of the image includes one or more invalid characters.

C. An image validation system as paragraph A or B recite, wherein the image comprises a proof of purchase; and wherein the indication of the likelihood that the image has been modified comprises an indication that the image is of a valid proof of purchase D. An image validation system as any of paragraphs A-C recite, wherein each of the operations is associated with a weighting factor; and wherein determining the authenticity of the image further includes: applying a respective weighting factor to each of the at least two operations to create at least two weighted operations; and determining the likelihood that the image has been modified based at least in part on the at least two weighted operations.

E. An image validation system as any of paragraphs A-D recite, wherein outputting the indication of the likelihood comprises: determining that the likelihood that the image has been modified is above a first likelihood threshold, below a second likelihood threshold, or between the first likelihood threshold and the second likelihood threshold; and in response to determining that the likelihood that the image has been modified is above the first likelihood threshold, outputting the indication to the computing device indicating that modification of the image has been detected.

F. An image validation system as any of paragraphs A-E recite, wherein outputting the indication of the likelihood comprises: determining that the likelihood that the image has been modified is above a first likelihood threshold, below a second likelihood threshold, or between the first likelihood threshold and the second likelihood threshold; and in response to determining that the likelihood that the image has been modified is below the second likelihood threshold, outputting the indication to the computing device indicating that modification of the image has not been detected.

G. An image validation system as any of paragraphs A-F recite, wherein outputting the indication of the likelihood comprises: determining that the likelihood that the image has been modified is above a first likelihood threshold, below a second likelihood threshold, or between the first likelihood threshold and the second likelihood threshold; and in response to determining that the likelihood that the image has been modified is between the first likelihood threshold and the second likelihood threshold, outputting the indication to the computing device indicating that modification of the image is probable.

H. An image validation system as paragraph G recites, the operations further comprising: sending a request to the computing device for additional information, the additional information comprising at least one of: an additional image of the subject depicted in the image, the additional image capturing the object from an angle different than an angle from which the image was captured; or a video of the object contained in the image.

I. An image validation system as any of paragraphs A-H recite, wherein the at least two operations further include: comparing at least one of: features of the image to features of a stored image; or metadata of the image to metadata of the stored image.

J. An image validation system as any of paragraphs A-I recite, wherein the likelihood that the image has been modified includes a likelihood that a subject depicted in the image has been modified.

K. A computer-implemented method comprising: obtaining, via a computing device, an image to be verified; sending, by the computing device, the image to an image verification service to determine whether the image has been tampered with or not based on a multi-factor analysis; receiving, at the computing device and from the image verification service, an indication of a likelihood that the image has been tampered with; and outputting, by the computing device, the indication of the likelihood that the image has been tampered with.

L. A computer-implemented method as paragraph K recites, further comprising: receiving metadata associated with image and analysis performed by the image verification service; and causing the image, the likelihood, the metadata, and the analysis to be stored in a data store.

M. A computer-implemented method as paragraph K or L recite, further comprising: identifying additional information associated with the image, the additional information including at least one of a device identification (ID) of a consumer computing device associated with the image, an Internet Protocol (IP) address associated with the consumer computing device, or a geographic location associated with the consumer computing device; and sending the additional information to the image verification service.

N. A computer-implemented method as any of paragraphs K-M recite, wherein sending the image to the image verification service comprises submitting the image to an application program interface (API) associated with the image verification service.

O. A computer-implemented method any of paragraphs K-O recite, wherein the indication of the likelihood that the image has been tampered with comprises an indication that tampering is probable; and wherein the computer-implemented method further comprises outputting, by the computing device, a request for additional information to determine whether the image has been tampered with or not.

P. A computer-implemented method comprising: obtaining, via a computing device a digital image for verification; in response to obtaining the digital image, analyzing the digital image to determine a likelihood that at least one of the digital image or a subject depicted in the digital image has been modified, the analyzing comprising at least two of the following operations: analyzing the digital image to detect a change in pixel density from a first portion of the digital image to a second portion of the digital image; comparing the digital image to a thumbnail of the digital image to detect a difference between the digital image and the thumbnail; analyzing metadata of the digital image to determine whether editing software has been used on the digital image; and analyzing a comparison between the digital image and a stored digital image to identify similarities between the digital image and the stored digital image; and outputting an indication, based at least in part on the analyzing the digital image, of the likelihood that at least one of the digital image or the subject depicted in the digital image has been modified.

Q. A computer-implemented method as paragraph P recites, wherein the operations further include at least one of: determining that a machine-readable code included in the digital image is associated with a particular product; determining that a product key included in the digital image is in an appropriate format for product keys; or determining that the product key included in the digital image included invalid characters for product keys.

R. A computer-implemented method as paragraph P or Q recite, wherein the operations further include at least one of: analyzing data associated with the digital image to identify a source of the digital image; or analyzing data associated with the digital image to identify a date of when the digital image was created.

S. A computer-implemented method as any of paragraphs P-R recite, wherein analyzing the digital image to determine a likelihood that at least one of the digital image or the subject depicted in the digital image has been modified comprises: applying a weighting factor to the at least two operations to create at least two weighted operations; and determining the likelihood that the at least one of the digital image or the subject depicted in the digital image has been modified based at least in part on the at least two weighted operations.

T. A computer-implemented method as any of paragraphs P-S recite, wherein the indication of the likelihood that at least one of the digital image or the subject depicted in the digital image has been modified comprises at least one of an indication that tampering has been detected, tampering has not been detected, or tampering is probable.

U. One or more computer-readable media encoded with instructions that, when executed by a processor, configure a computer to perform a computer-implemented method as any of paragraphs K-T recite.

V. A device comprising one or more processors and one or more computer-readable media encoded with instructions that, when executed by the one or more processors, configure a computer to perform a computer-implemented method as any of paragraphs K-T recite.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. An image validation system comprising:
one or more processors; and
memory communicatively coupled to the one or more processors and storing one or more modules that, when executed by the one or more processors, cause the image validation system to perform operations comprising:
obtaining, from a computing device, an image of a prepaid card for which a user is attempting to obtain concessions;
identifying a first portion of the image that contains at least one of a date, a product key, product information, or a machine-readable code;
determining authenticity of the image using at least two operations, wherein a respective weighting factor representing an indication strength of image modification is applied to each of the at least two operations in association with the determining the authenticity of the image, the at least two operations selected from a group comprising:
analyzing the image to detect a change in pixel density within the first portion of the image or a change in pixel density from the first portion of the image to a second portion of the image;
comparing the image to a thumbnail of the image to detect a difference between the first portion of the image and the thumbnail;
analyzing data associated with the image to determine whether image editing software has been used on the image; or
analyzing data associated with the image to identify at least one of a time the image was captured or a geographic location at which the image was captured;
determining, based at least in part on the authenticity of the image, a likelihood that the image has been modified; and
outputting an indication of the likelihood that the image has been modified.

2. The image validation system of claim 1, wherein the analyzing the image to detect the change in pixel density within the first portion of the image or the change in pixel density from the first portion of the image to the second portion of the image comprises:
performing optical character recognition on the image to identify text included in the image; and
determining, from the text, that the first portion of the image contains at least one of the date, the product key, or the product information.

3. The image validation system of claim 1, wherein the outputting the indication of the likelihood that the image has been modified comprises:
determining that the likelihood that the image has been modified is above a likelihood threshold; and
in response to determining that the likelihood that the image has been modified is above the likelihood threshold, outputting an indication to the computing device indicating that modification of the image has been detected.

4. The image validation system of claim 1, wherein the outputting the indication of the likelihood that the image has been modified comprises:
determining that the likelihood that the image has been modified is below a likelihood threshold; and
in response to determining that the likelihood that the image has been modified is below the likelihood threshold, outputting an indication to the computing device indicating that modification of the image has not been detected.

5. The image validation system of claim 1, wherein the outputting the indication of the likelihood that the image has been modified comprises:
determining that the likelihood that the image has been modified is between a first likelihood threshold and a second likelihood threshold; and
in response to determining that the likelihood that the image has been modified is between the first likelihood threshold and the second likelihood threshold, outputting an indication to the computing device indicating that modification of the image is probable.

6. The image validation system of claim 5, the operations further comprising:
sending a request to the computing device for additional information, the additional information comprising at least one of:
an additional image of a subject of the image, the additional image capturing the subject of the image from an angle different than an angle from which the image was captured; or
a video of the subject of the image.

7. The image validation system of claim 1, wherein the at least two operations further include:
comparing at least one of:
features of the image to features of a stored image; or
metadata of the image to metadata of the stored image.

8. The image validation system of claim 1, wherein the likelihood that the image has been modified includes a likelihood that a subject depicted in the image has been modified.

9. A computer-implemented method comprising:
obtaining, via a computing device, an image of a prepaid card for which a user is attempting to obtain concessions;
identifying a first portion of the image that contains at least one of a date, a product key, product information, or a machine-readable code;
determining authenticity of the image using at least two operations, wherein a respective weighting factor representing an indication strength of image modification is applied to each of the at least two operations in association with the determining the authenticity of the image, the at least two operations selected from a group comprising:
analyzing the image to detect a change in pixel density within the first portion of the image or a change in pixel density from the first portion of the image to a second portion of the image;

comparing the image to a thumbnail of the image to detect a difference between the first portion of the image and the thumbnail;

analyzing metadata of the image to determine whether editing software has been used on the image; or analyzing a comparison between the image and a stored image to identify similarities between the image and the stored image;

determining, based at least in part on the authenticity of the image, a likelihood that the image has been modified; and outputting an indication of the likelihood that the image has been modified.

10. The computer-implemented method of claim 9, wherein the analyzing the image to detect the change in pixel density within the first portion of the image or a change in pixel density from the first portion of the image to the second portion of the image comprises:

performing optical character recognition on the image to identify text included in the image; and determining, from the text, that the first portion of the image contains at least one of the date, the product key, or the product information.

11. The computer-implemented method of claim 9, wherein the operations further include at least one of:

analyzing data associated with the image to identify a source of the image; or analyzing data associated with the image to identify a date of when the image was created.

12. The computer-implemented method of claim 9, wherein the indication of the likelihood that the image has been modified comprises at least one of an indication that tampering has been detected, tampering has not been detected, or tampering is probable.

13. An image validation system comprising:

one or more processors; and memory communicatively coupled to the one or more processors and storing one or more modules that, when executed by the one or more processors, cause the image validation system to perform operations comprising:

obtaining, from a computing device, an image of a prepaid card for which a user is attempting to obtain concessions;

identifying a first portion of the image that contains at least one of a date, a product key, product information, or a machine-readable code;

selecting at least two operations to determine authenticity of the image, wherein the at least two operations are selected from a group comprising:

analyzing the image to detect a change in pixel density within the first portion of the image or a change in pixel density from the first portion of the image to a second portion of the image;

comparing the image to a thumbnail of the image to detect a difference between the first portion of the image and the thumbnail;

analyzing data associated with the image to determine whether image editing software has been used on the image; or analyzing data associated with the image to identify at least one of a time the image was captured or a geographic location at which the image was captured;

applying a respective weighting factor representing an indication strength of image modification to results of each of the at least two operations to produce a weighted result;

determining, based at least in part on the weighted result, a likelihood that the image has been modified; and outputting an indication of the likelihood that the image has been modified.

14. The image validation system of claim 13, wherein the operations further comprise determining that the weighted result is above a threshold, wherein the likelihood that the image has been modified indicates that modification of the image has been detected based on the weighted result being above the threshold.

15. The image validation system of claim 13, wherein the operations further comprise determining that the weighted result is below a threshold, wherein the likelihood that the image has been modified indicates that modification of the image has not been detected based on the weighted result being below the threshold.

16. The image validation system of claim 13, wherein the operations further comprise determining that the weighted result is between a first threshold and a second threshold, wherein the likelihood that the image has been modified indicates that modification of the image is probable based on the weighted result being between the first threshold and the second threshold.

17. The image validation system of claim 13, the operations further comprising sending a request to the computing device for additional information, the additional information comprising at least one of:

an additional image of a subject of the image, the additional image capturing the subject of the image from an angle different than an angle from which the image was captured; or a video of the subject of the image.

* * * * *